United States Patent [19]

Kochte et al.

[11] 4,017,961

[45] Apr. 19, 1977

[54] METHOD OF PRODUCING DRAG ON AN OPERATING ROD

[75] Inventors: Werner W. F. K. Kochte, Ravenna, Ohio; Donald D. Bartholomew, Utica, Mich.

[73] Assignee: Merit Plastics, Inc., East Canton, Ohio

[22] Filed: June 5, 1975

[21] Appl. No.: 584,145

Related U.S. Application Data

[63] Continuation of Ser. No. 353,591, April 23, 1973, abandoned.

[52] U.S. Cl. .................... 29/450; 74/503; 264/278

[51] Int. Cl.² ............................... B23P 11/02

[58] Field of Search ............ 29/450; 74/503 X; 249/142; 264/275, 278 X, 279; 425/DIG. 44

[56] References Cited

UNITED STATES PATENTS

| | | | |
|---|---|---|---|
| 1,800,254 | 4/1931 | Holmes | 74/503 X |
| 3,271,845 | 9/1966 | Breher | 264/278 X |
| 3,352,958 | 11/1967 | Andrews | 264/275 X |
| 3,499,066 | 3/1970 | Murray | 264/278 X |
| 3,524,619 | 8/1970 | Natkins | 249/142 |

*Primary Examiner*—Charlie T. Moon
*Attorney, Agent, or Firm*—Harness, Dickey & Pierce

[57] ABSTRACT

A holder for supporting a rod for rotation or longitudinal movement is molded from a plastic material. The holder is T-shaped having a central elongated portion through which the rod extends and transverse wings with apertures therethrough by which the holder is supported on a member. The cavity in the mold has a rod extending therethrough with a ring of elastomeric material thereon about which the plastic material is injected to mold the holder as a unit element with the elastomeric ring retained therein when the supporting rod is pulled therefrom. It is only necessary to insert the operating rod within the holder through the elastomeric ring which will be compressed so that it will apply a predetermined drag on the rod to restrict its longitudinal and rotational movement.

3 Claims, 4 Drawing Figures

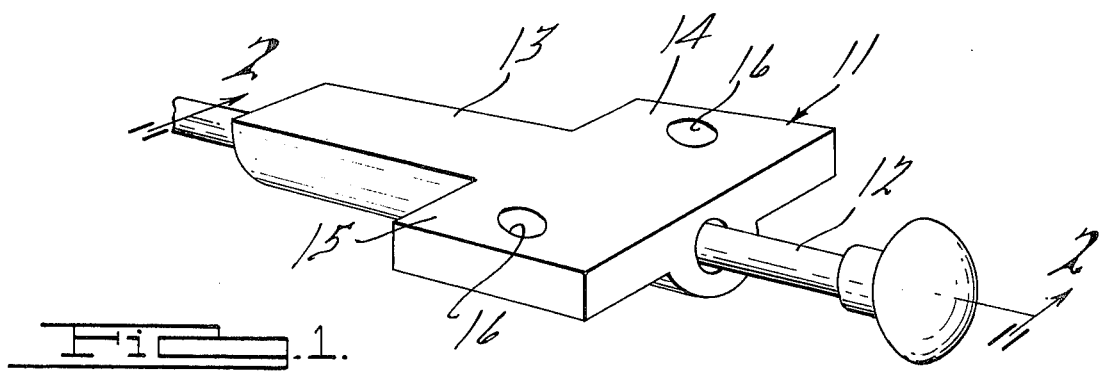
FIG. 1.
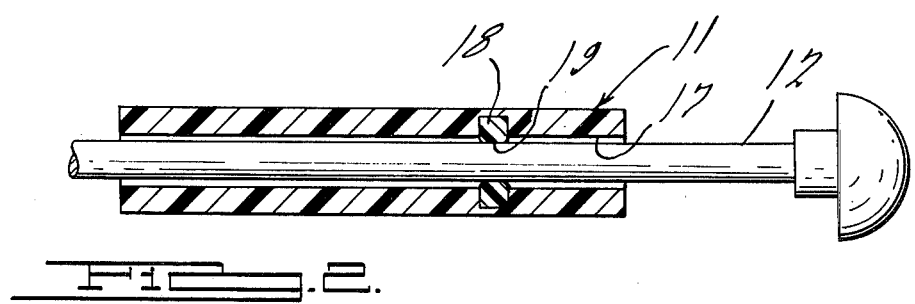
FIG. 2.
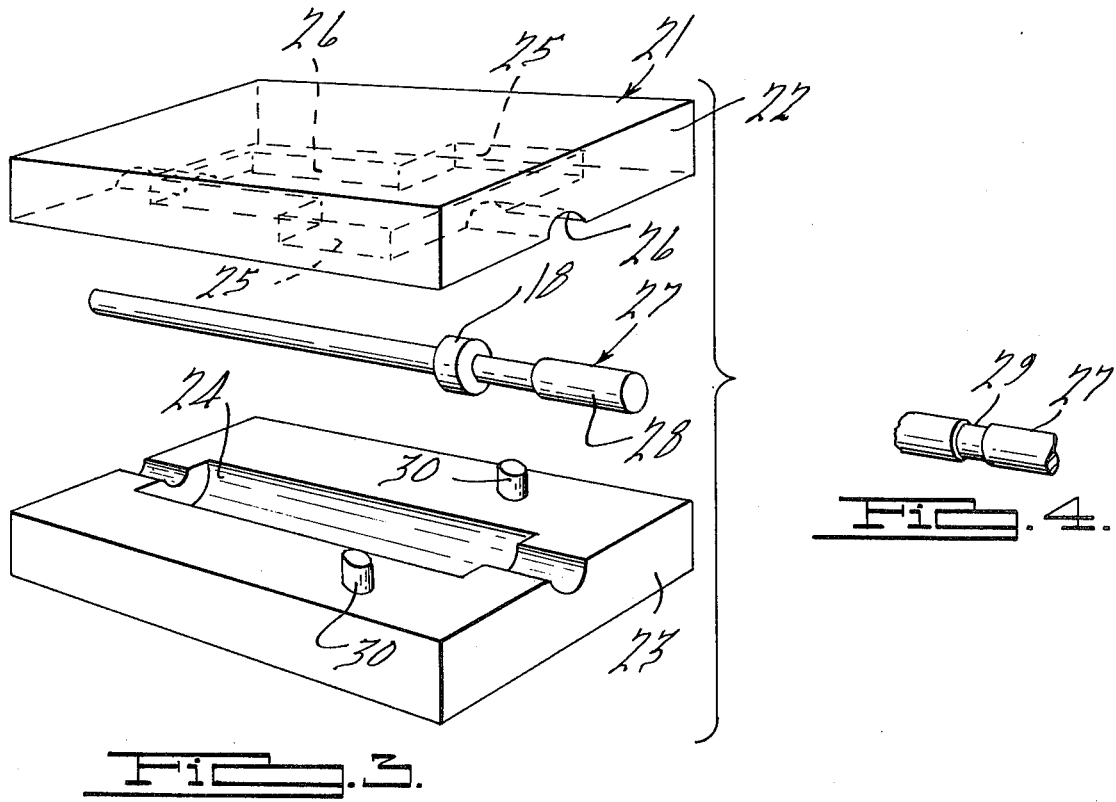
FIG. 3.
FIG. 4.

METHOD OF PRODUCING DRAG ON AN OPERATING ROD

This is a continuation of application Ser. No. 353,591, filed Apr. 23, 1973, now abandoned.

BACKGROUND OF THE INVENTION

Reference may be had to the patent to J. A. Holly, U.S. Pat. No. 3,411,374, that to C. E. Hendrix, U.S. Pat. No. 1,830,736, and that to R. A. Waterman, U.S. Pat. No. 1,535,703, to show the state of the prior art.

SUMMARY OF THE INVENTION

The invention pertains to a holder for an operating rod molded from a plastic material with a ring of elastomeric material embedded therein in position to engage an operating rod and apply a drag thereon. A two-part mold is employed having a T-shaped cavity with semi-cylindrical end apertures. A rod is supported in the end aperture with a washer-like element thereon of elastomeric material about which the plastic material is disposed when injected into the cavity after the mold is closed. As soon as the plastic material is cured, the mold is opened, the holder is removed and the rod is withdrawn from the holder and the washer. The washer will be under pressure and will bulge outwardly in the center in position to grip the operating rod when inserted in the holder in place of the rod employed during the molding operation. The elastomeric ring applies a drag on the operating rod when moved so that it may be effective to perform in rotation or longitudinally. The inwardly bulging washer will be further compressed by the rod and will provide a substantial drag thereon when operated and will also function as an anti-rattle element to prevent the rod from moving and vibrating within the holder.

BRIEF DESCRIPTION OF THE DRAWING

FIG. 1 is a view in perspective of the holder for an operating rod embodying feature of the present invention;

FIG. 2 is an enlarged sectional view of the structure illustrated in FIG. 1, taken on the line 2—2 thereof;

FIG. 3 is an exploded view of a mold which is used to produce the holder illustrated in FIGS. 1 and 2; and FIG. 4 is a portion of the operating rod illustrated in FIG. 2 showing a modified form thereof.

BRIEF DESCRIPTION OF THE PREFERRED EMBODIMENTS

A holder 11 for an operating rod 12 is of T-shape having a central portion 13 provided with aligned wings 14 and 15 extending in opposite directions therefrom. The wings have apertures 16 therethrough by which the holder is supported on a member. The holder 11 is made from a rigid plastic material with the central portion 13 provided with an aperture 17 and a drag element 18, the aperture 17 being slightly larger than the operating rod 12. As herein illustrated, the drag element is of ring shape, made of elastomeric material provided with a central opening 19 through which the operating rod 12 extends. The holder 11 is produced in a mold 21 having an upper section 22 and a lower section 23. The mold section 23 has a central cavity portion 24 in which the central portion 13 of the holder is molded. The underface of the upper section 22 has sideward recesses 25 extending from a central cavity 26 in which the upper parts of the central portion 13 and the wings 14 and 15 are molded.

A rod-like core 27 is placed within the mold having on the main body thereof the drag ring 18 which is located within the wing area by the end section 28 of larger diameter. After the core is in position and the top section 22 placed upon the bottom section 23, the plastic material is injected within the combined cavities about the element or ring 18. The injection pressure compresses the ring and the hardening of the plastic retains or increases the pressure thereon. This causes the center of the ring to bulge inwardly in position to engage the operating rod 12 when inserted therethrough with a substantial force. After the operating rod 12 is inserted in the aperture 17 and ring element 18, it will be retained against displacement and also against rattling while being permitted to rotate or move longitudinally.

Projecting pins 30 extend upwardly from the lower mold section 23 into the sideward recesses 25 of the upper mold section 22 to form an aperture 16 in each of the wings 14 and 15. When it is desired to locate the drag ring 18 at a specific distance from one end of the mold cavities, the core 27, as illustrated in FIG. 4, may be provided with an annular recess 29 which will receive and locate the drag ring 18 thereon. Any plastic material known to be suitable for the holder may be employed therefor such as polyethylene, polypropylene, nylon and the like.

We claim:

1. The method of constructing an operation rod assembly to prevent the rod from rattling within its holder which includes the steps of: supporting an elastomeric ring on a rod-like core said elastomeric ring being of a smaller inner diameter than the diameter of an operating rod to be inserted therein, supporting the rod-like core with said elastomeric ring thereon in a mold across a cavity therein, injecting a plastic material within the cavity about said rod-like core and elastomeric ring to form the holder, removing said holder from the mold, removing said rod-like core from said holder to provide a longitudinally extending aperture, and inserting said operating rod having a diameter slightly smaller than said rod-like core within said aperture and through said elastomeric ring for longitudinal movement within said aperture with the operating rod retained in place after movement by said elastomeric ring which also prevents the rattling of the operating rod within the aperture.

2. The method of constructing an operating rod assembly as recited in claim 1, wherein an annular recess is provided on the rod-like core engaged by the elastomeric ring for locating it within the mold cavity when the rod-like core is disposed thereacross, said annular recess having a cross sectional diameter slightly smaller than the diameter of said operating rod so as to allow said elastomeric ring to compressably engage said operating rod thereby retaining said operating rod in place.

3. The method of constructing an operating rod assembly as recited in claim 1, which includes the step of providing projections within the mold cavity to form apertures in the holder by which it is secured to a member.

* * * * *